US010679358B2

United States Patent
On

(10) Patent No.: US 10,679,358 B2
(45) Date of Patent: Jun. 9, 2020

(54) LEARNING IMAGE AUTOMATIC SORTING DEVICE, LEARNING IMAGE AUTOMATIC SORTING METHOD, AND LEARNING IMAGE AUTOMATIC SORTING PROGRAM

(71) Applicant: OLYMPUS CORPORATION, Tokyo (JP)

(72) Inventor: Seigo On, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 131 days.

(21) Appl. No.: 16/015,834

(22) Filed: Jun. 22, 2018

(65) Prior Publication Data

US 2018/0300885 A1   Oct. 18, 2018

Related U.S. Application Data

(63) Continuation of application No. PCT/JP2015/085821, filed on Dec. 22, 2015.

(51) Int. Cl.
G06T 7/00 (2017.01)
G06T 7/246 (2017.01)
G06T 7/254 (2017.01)
G06K 9/62 (2006.01)
G06T 7/73 (2017.01)
G06K 9/66 (2006.01)

(52) U.S. Cl.
CPC ............ *G06T 7/248* (2017.01); *G06K 9/6255* (2013.01); *G06K 9/66* (2013.01); *G06T 7/254* (2017.01); *G06T 7/74* (2017.01); *G06T 2207/10024* (2013.01); *G06T 2207/10068* (2013.01); *G06T 2207/20021* (2013.01); *G06T 2207/20076* (2013.01); *G06T 2207/20081* (2013.01); *G06T 2207/30096* (2013.01)

(58) Field of Classification Search
None
See application file for complete search history.

(56) References Cited

U.S. PATENT DOCUMENTS

| 6,941,007 B1* | 9/2005 | Do | G06K 9/6253 |
| | | | 382/143 |
| 2011/0090359 A1 | 4/2011 | Sagawa | |
| 2011/0091097 A1* | 4/2011 | Umeda | G06K 9/6255 |
| | | | 382/159 |
| 2011/0170769 A1* | 7/2011 | Sakimura | G06K 9/6253 |
| | | | 382/159 |

(Continued)

FOREIGN PATENT DOCUMENTS

| JP | H11-282822 A | 10/1999 |
| JP | 2003-298927 A | 10/2003 |

(Continued)

OTHER PUBLICATIONS

International Search Report dated Feb. 2, 2016 issued in PCT/JP2015/085821.

*Primary Examiner* — Delomia L Gilliard
(74) *Attorney, Agent, or Firm* — Scully, Scott, Murphy & Presser, P.C.

(57) ABSTRACT

A learning image automatic sorting device for sorting learning images to be stored while identifying and eliminating repeated images by discriminating the geometric deformation, changes in grayscale, the difference in noise level, and the like.

8 Claims, 7 Drawing Sheets

(56) References Cited

U.S. PATENT DOCUMENTS

| | | | | |
|---|---|---|---|---|
| 2013/0142422 A1* | 6/2013 | Takita | ............... | G06K 9/62 |
| | | | | 382/159 |
| 2015/0071529 A1* | 3/2015 | Yokoi | ............... | G06K 9/6256 |
| | | | | 382/159 |
| 2016/0026900 A1* | 1/2016 | Ando | ............... | G06K 9/4642 |
| | | | | 382/159 |
| 2017/0367685 A1* | 12/2017 | Zou | ............... | G06K 9/6215 |
| 2019/0104308 A1* | 4/2019 | Nishida | ............... | H04N 19/463 |

FOREIGN PATENT DOCUMENTS

| | | | |
|---|---|---|---|
| JP | 2011-086183 | A | 4/2011 |
| JP | 2011-090413 | A | 5/2011 |
| JP | 2011-145791 | A | 7/2011 |
| JP | 2013-109758 | A | 6/2013 |
| JP | 2014-085795 | A | 5/2014 |

* cited by examiner

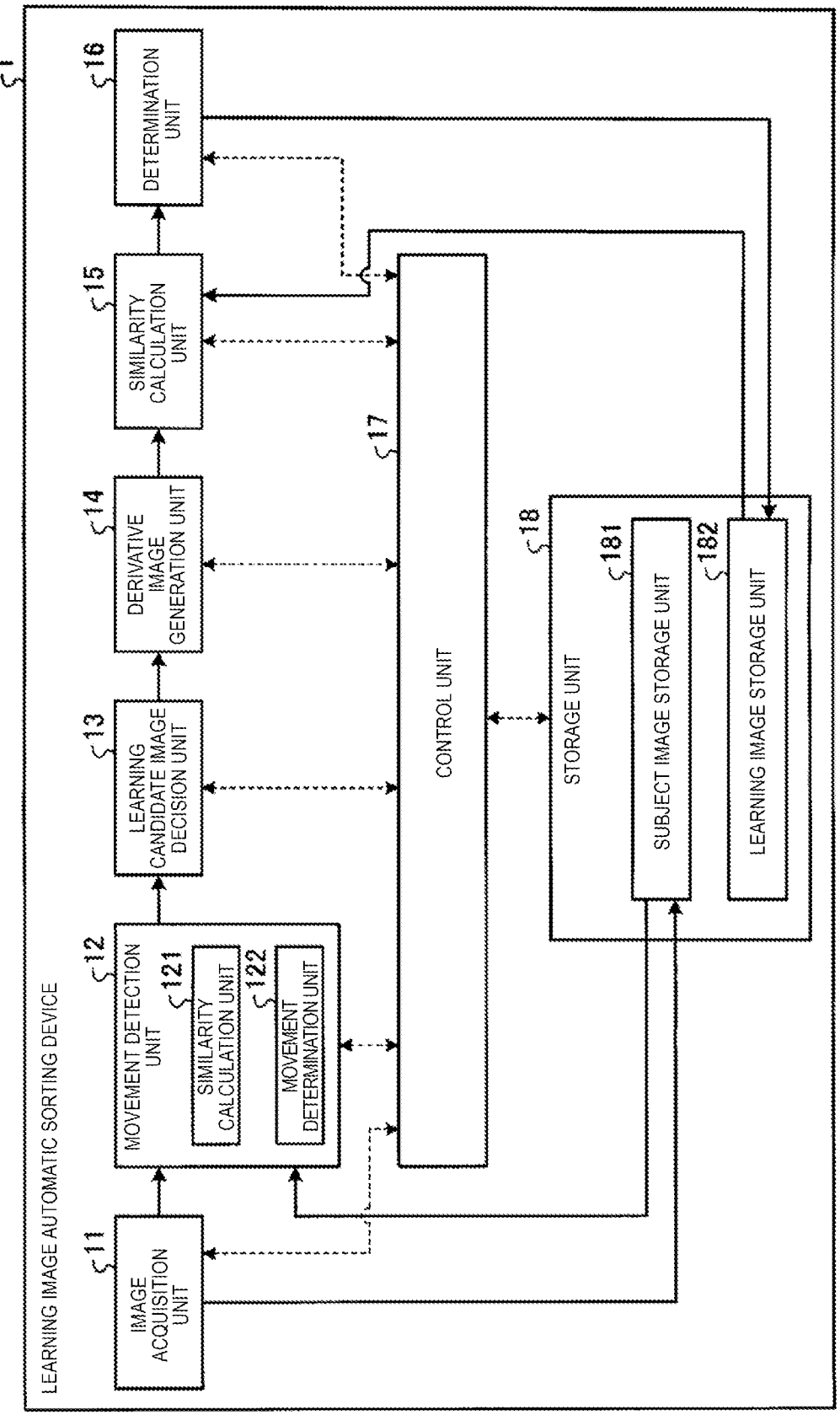
[Fig. 1]

[Fig. 2]
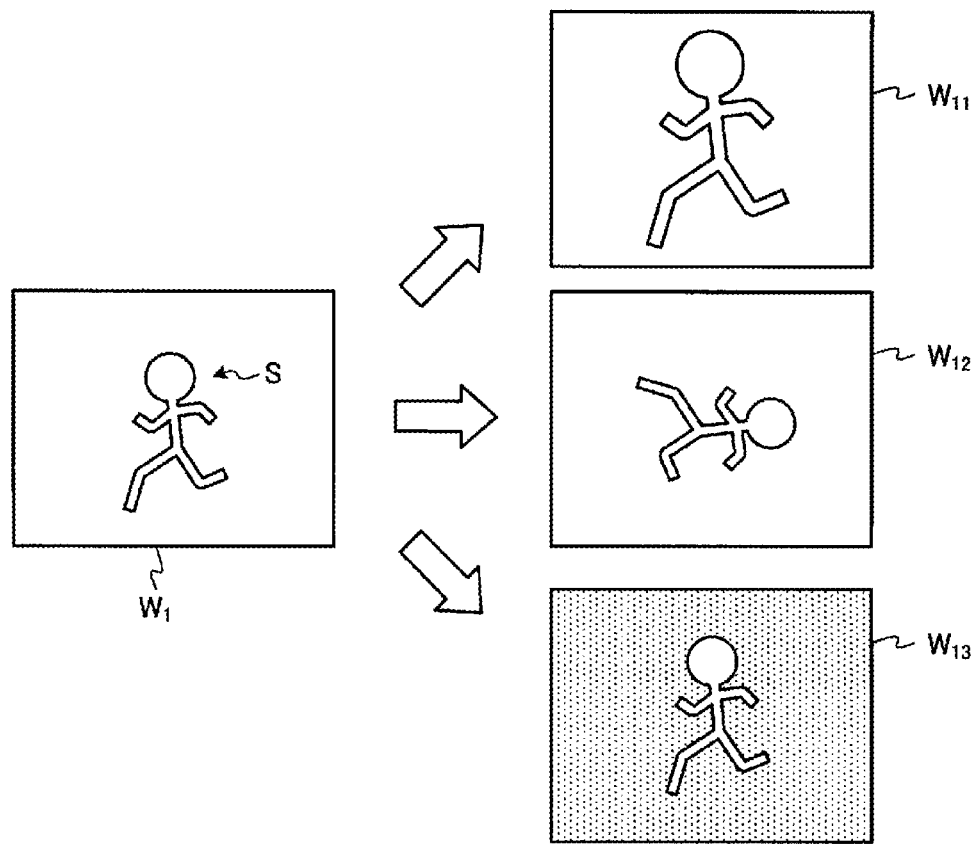

[Fig. 3]
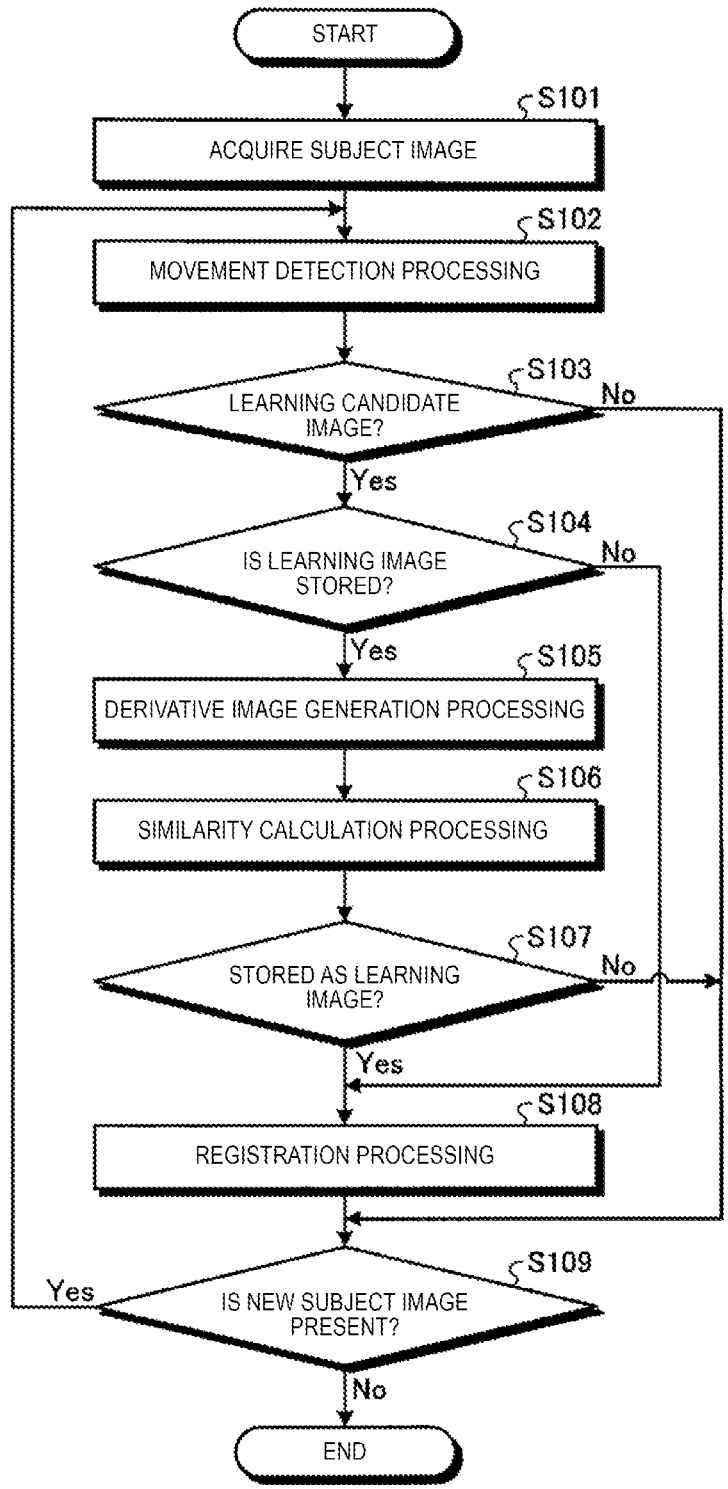

[Fig. 4]
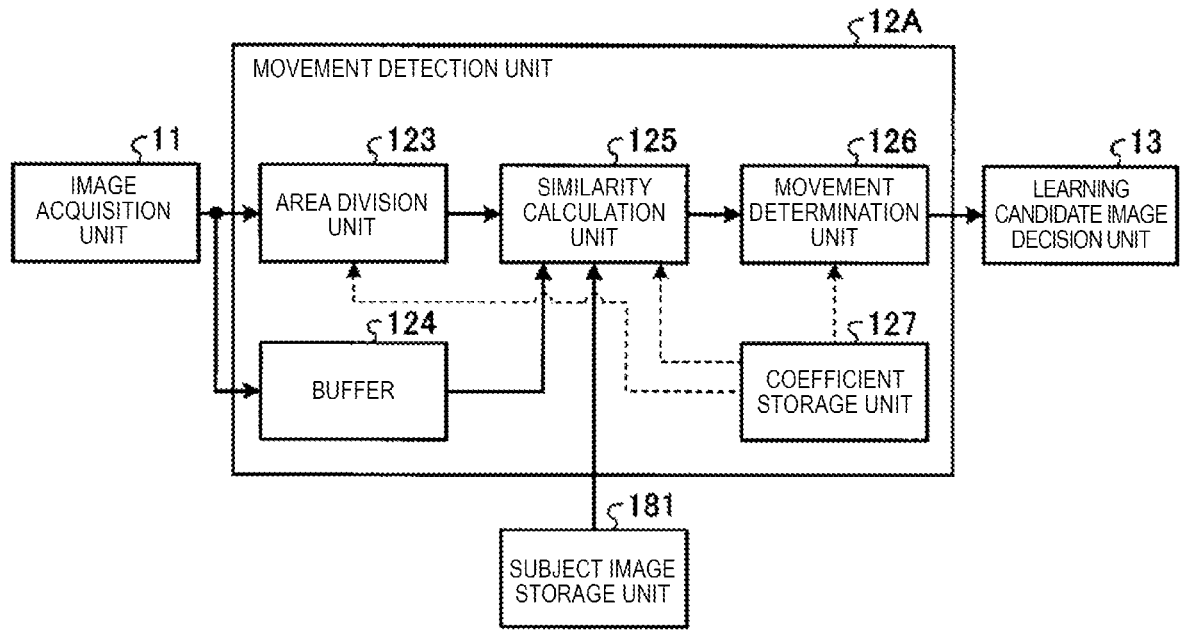
[Fig. 5]
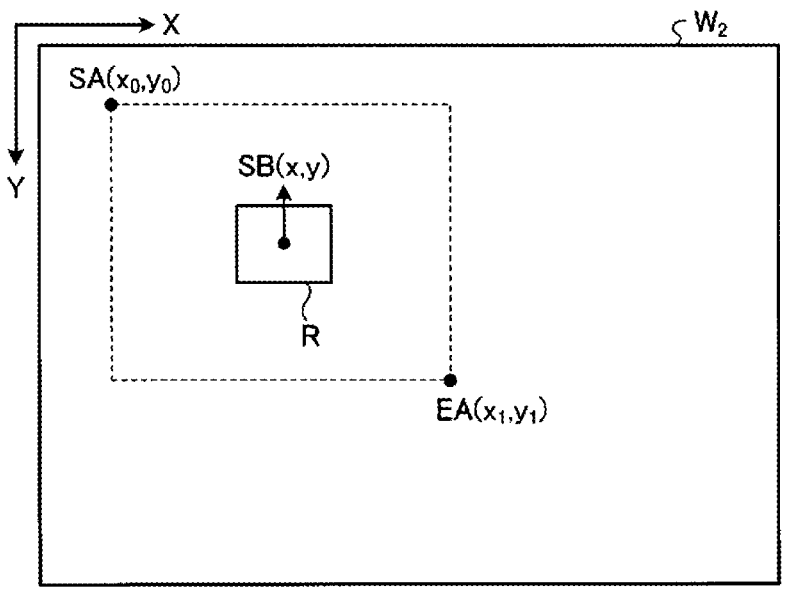

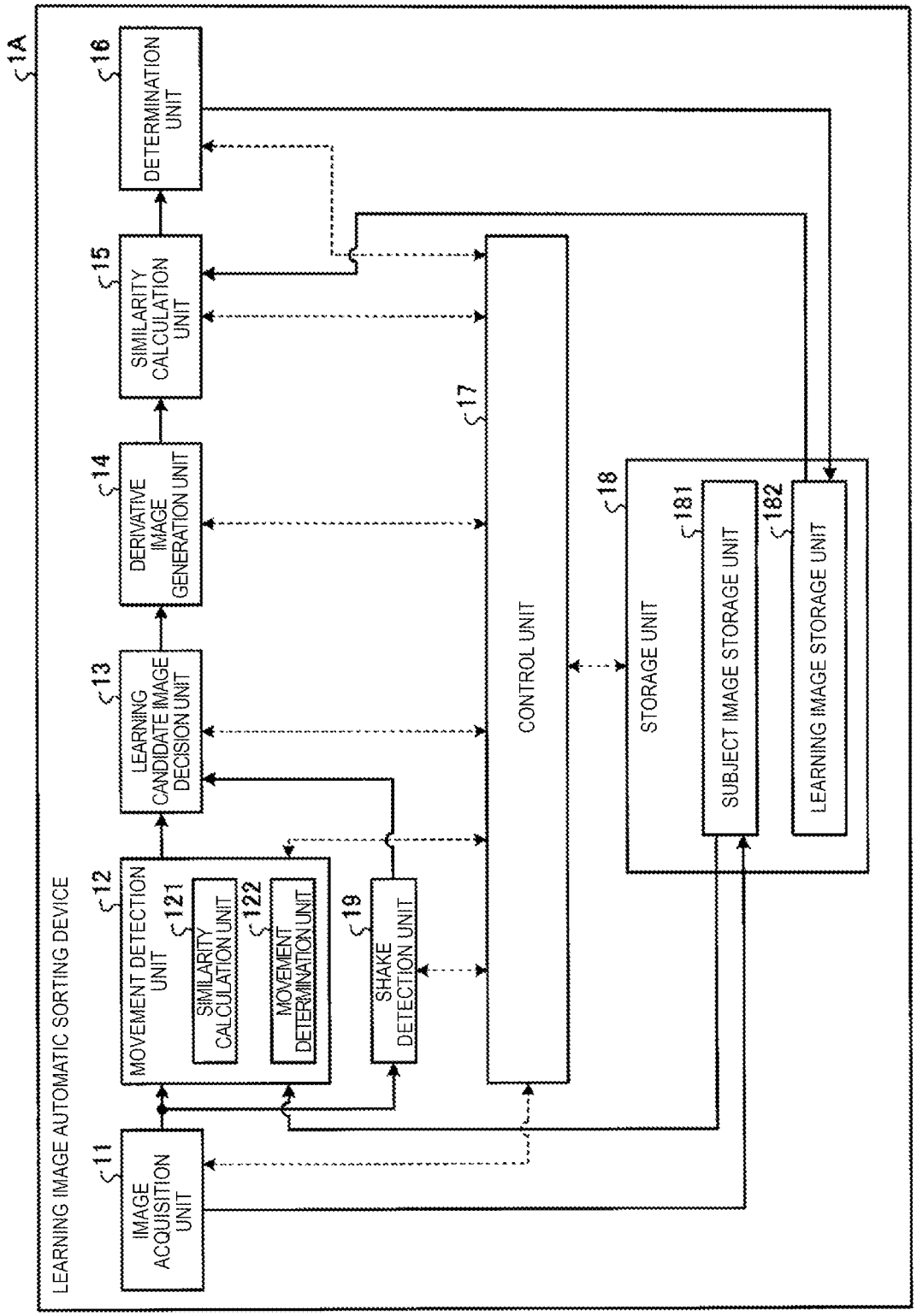
[Fig. 6]

[Fig. 7]
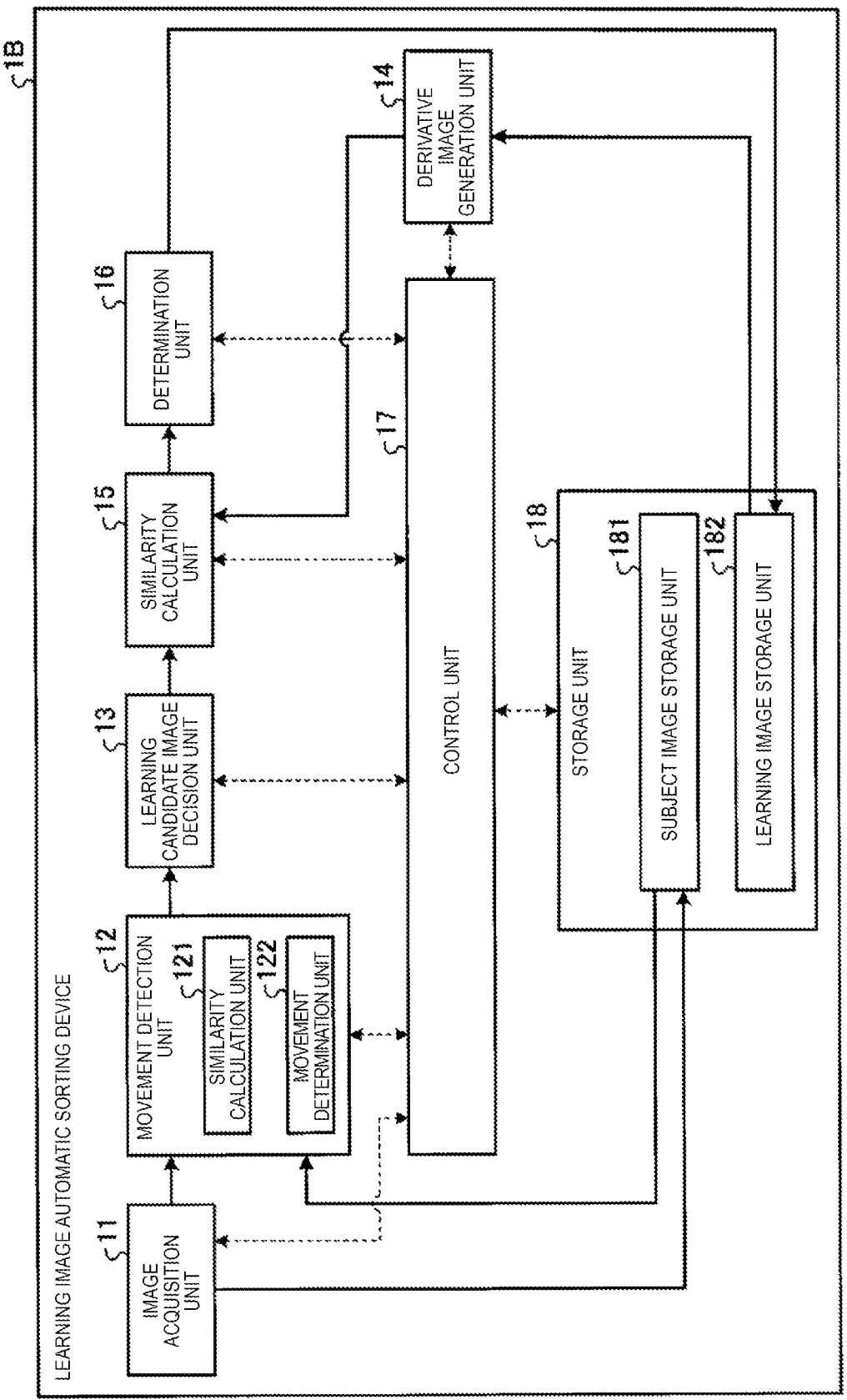

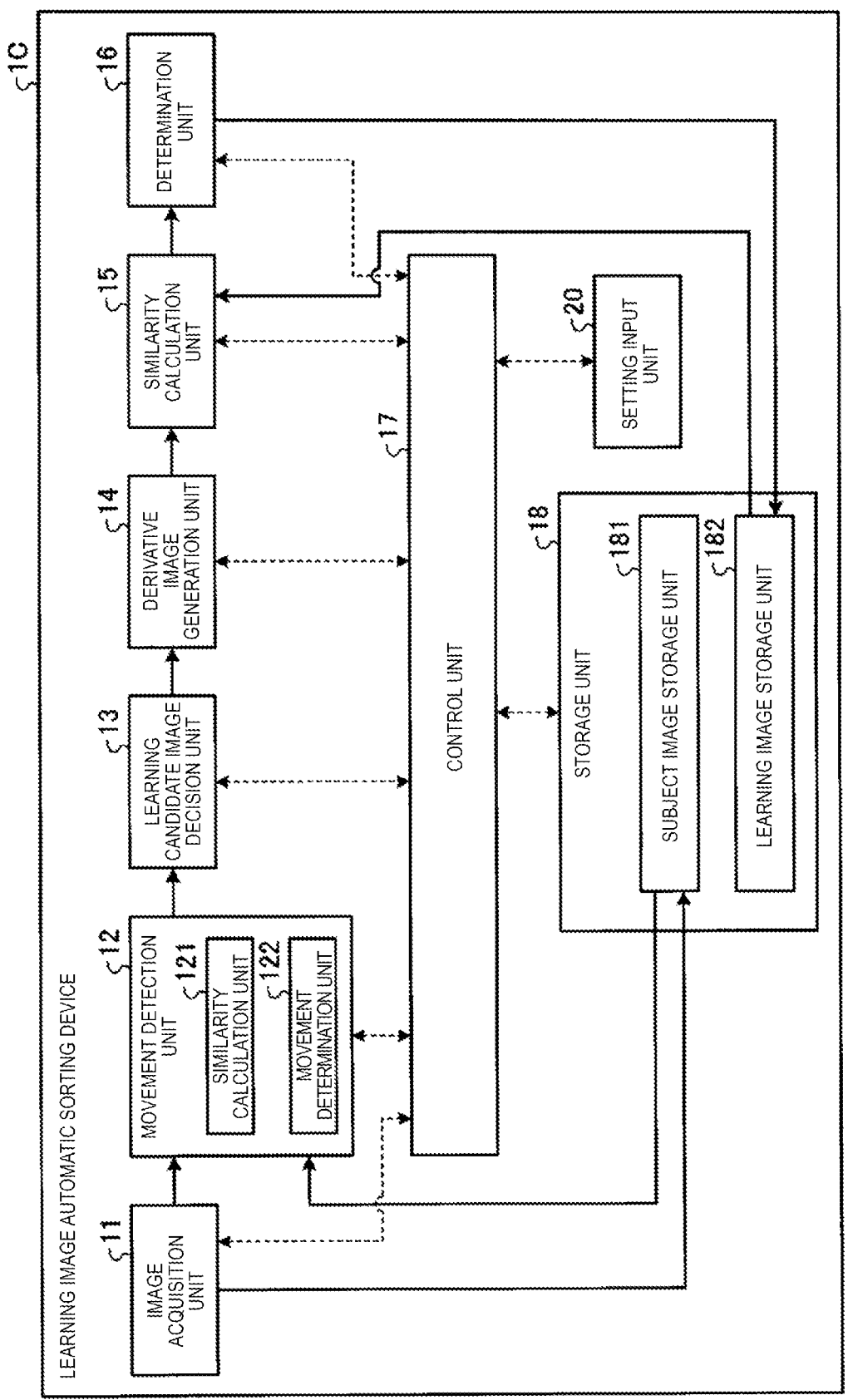
[Fig. 8]

LEARNING IMAGE AUTOMATIC SORTING DEVICE, LEARNING IMAGE AUTOMATIC SORTING METHOD, AND LEARNING IMAGE AUTOMATIC SORTING PROGRAM

CROSS-REFERENCE TO RELATED APPLICATIONS

This application is a continuation of PCT International Application No. PCT/JP2015/085821, filed on Dec. 22, 2015. The entire disclosure of PCT International Application No. PCT/JP2015/085821 is incorporated by reference.

BACKGROUND

Technical Field

The present invention relates to a learning image automatic sorting device, a learning image automatic sorting method, and a learning image automatic sorting program for sorting images to be stored as learning images based on images.

Background Art

Recently, in the field of endoscopic diagnosis, an image recognition technology that can be used for organ classification, a lesion detection, checking a status of a past digestive surgery, and the like is known. In the image recognition technology, for example, a feature amount vector is calculated by feature amount extraction processing using images of mucosal regions and abnormal regions of various variations extracted from an intra-luminal image that is a past endoscopic image as a learning image, a representative feature amount (a visual word) most similar to each local feature amount is selected by clustering processing from a plurality of local feature quantities that locally exist, and learning discriminator for discriminating an unknown image is constructed. Then, a currently-captured image is recognized based on the constructed learning discriminator.

In order to improve the recognition accuracy, it is important that the learning images for constructing the learning discriminator uniformly include the images of assumed scenes in accordance with the purpose of diagnosis. Although, it is possible for a person to visually sort past endoscopic images, it takes a huge amount of time to sort learning images from thousands or tens of thousands of images. In order to solve this problem, a learning image generation technology is known, in which a representative object is extracted from captured images and the extracted image is stored as a learning image (for example, refer to PTL 1). In addition, a technology is also known, in which a movement of a subject (the representative object) is determined using temporally successive images, and the images determined to be moved are sorted (for example, refer to PTL 2).

CITATION LIST

Patent Literature

PTL 1: JP-A-2011-145791
PTL 2: JP-A-2003-298927

SUMMARY

However, when the learning image is sorted and stored using the technologies disclosed in PTL 1 and PTL 2, due to a geometric deformation, changes in grayscale, a difference in noise level, and the like, similar images are selected in a repeated manner, and the number of stored learning images is increased to a huge number, which eventually causes problems in management.

The present invention has been made in view of the problems described above, and has an object of providing a learning image automatic sorting device, a learning image automatic sorting method, and a learning image automatic sorting program that can sort the learning images to be stored while identifying and eliminating the repeated images by discriminating the geometric deformation, changes in grayscale, the difference in noise level, and the like.

In order to solve the problems described above and to achieve the object, a learning image automatic sorting device in the present invention automatically sorts learning images used for image recognition processing from a plurality of captured images captured in time series. The device includes: movement detection means for detecting a movement amount of a subject in an image of interest using the image of interest which is a sorting determination target among the plurality of captured images and an image captured temporally earlier than the image of interest; a decision unit that decides whether or not to select the image of interest as a learning candidate image based on the movement amount; a derivative image generation unit that generates one or a plurality of derivative images using at least one of the image of interest selected as the learning candidate image by the decision unit and the learning image; a similarity calculation unit that calculates a similarity between the learning candidate image and the learning image and a similarity between the one or the plurality of derivative images and the learning image, or a similarity between the one or the plurality of derivative images and the learning candidate image; a sorting unit that sorts the image of interest selected as the learning candidate image as a new learning image based on the similarity calculated by the similarity calculation unit and the statistically determined condition; and a storage unit that stores the learning image.

In order to solve the problems described above and to achieve the object described above, a learning image automatic sorting method in the present invention performed by a learning image automatic sorting device is a method for automatically sorting a learning image used for image recognition processing from a plurality of captured images captured in time series. The method includes: detecting a movement amount of a subject in an image of interest using the image of interest which is the sorting determination target among the plurality of captured images and an image captured temporally earlier than the image of interest; deciding whether or not to select the image of interest as a learning candidate image based on the movement amount; generating one or a plurality of derivative images using at least one of the image of interest selected as the learning candidate image by the decision unit and the learning image; calculating a similarity between the learning candidate image and the learning image and a similarity between the one or the plurality of derivative images and the learning image, or a similarity between the one or the plurality of derivative images and the learning candidate image; sorting the image of interest selected as the learning candidate image as a new learning image based on the similarity calculated by the similarity calculation unit and the statistically determined condition; and storing the image of interest selected as the selected learning candidate image as the learning image.

In order to solve the problems described above and to achieve the object, a learning image automatic sorting program in the present invention is a program executed by a learning image automatic sorting device that automatically sorts a learning image used for image recognition processing from a plurality of captured images captured in time series. The program causes a computer to execute: a detection procedure for detecting the movement amount of a subject in an image of interest using the image of interest which is the sorting determination target among the plurality of captured images and an image captured temporally earlier than the image of interest; a decision procedure for deciding whether or not to select the image of interest as a learning candidate image based on the movement amount; a derivative image generation procedure for generating one or a plurality of derivative images using at least one of the image of interest selected as the learning candidate image by the decision unit and the learning image; a similarity calculation procedure for calculating a similarity between the learning candidate image and the learning image and a similarity between the one or the plurality of derivative images and the learning image, or a similarity between the one or the plurality of derivative images and the learning candidate image; a sorting procedure for sorting the image of interest selected as the learning candidate image as a new learning image based on the similarity and statistically determined conditions, and a storing procedure for storing the image of interest selected as the selected learning candidate image as the learning image.

According to the present invention, it is possible to efficiently sort the learning images to be stored while identifying and eliminating the repeated images by discriminating the geometric deformation, changes in grayscale, the difference in noise level, and the like.

BRIEF DESCRIPTION OF THE DRAWINGS

FIG. 1 is a block diagram illustrating a functional configuration of a learning image automatic sorting device in an embodiment 1 of the present invention.

FIG. 2 is a diagram illustrating a derivative image generated by a derivative image generation unit of the learning image automatic sorting device in the embodiment 1 of the present invention.

FIG. 3 is a flowchart illustrating processing performed by the learning image automatic sorting device in the embodiment 1 of the present invention.

FIG. 4 is a block diagram illustrating a configuration of a movement detection unit of a learning image automatic sorting device in a modification example 1 of the embodiment 1 of the present invention.

FIG. 5 is a diagram for explaining the movement detection performed by the movement detection unit of the learning image automatic sorting device in the modification example 1 of the embodiment 1 of the present invention.

FIG. 6 is a block diagram illustrating a functional configuration of a learning image automatic sorting device in a modification example 2 of the embodiment 1 of the present invention.

FIG. 7 is a block diagram illustrating a functional configuration of a learning image automatic sorting device in an embodiment 2 of the present invention.

FIG. 8 is a block diagram illustrating a functional configuration of a learning image automatic sorting device in an embodiment 3 of the present invention.

DETAILED DESCRIPTION

Hereinafter, embodiments of the present invention will be described with reference to the drawings. The present invention is not limited by the embodiments described below. In addition, the drawings referred to in the descriptions below are only schematically illustrating shapes, sizes, and positional relationships to the extent that the contents of the present invention can be understood. That is, the present invention is not limited to the shapes, sizes, and positional relationships illustrated in each drawing. In addition, the descriptions will be made while giving the same reference signs to the same elements.

Embodiment 1

FIG. 1 is a block diagram illustrating a functional configuration of a learning image automatic sorting device 1 in an embodiment 1 of the present invention. The learning image automatic sorting device 1 illustrated in FIG. 1 includes an image acquisition unit 11, a movement detection unit 12, a learning candidate image decision unit 13 (decision unit), a derivative image generation unit 14, a similarity calculation unit 15, a determination unit 16 (sorting unit), a control unit 17, and a storage unit 18. The storage unit 18 includes a subject image storage unit 181 that stores subject images acquired by the image acquisition unit 11 and a learning image storage unit 182 that stores a learning image which is an image used when the image recognition is performed and is an image of various variations extracted from past images.

The image acquisition unit 11 receives an image signal from the outside, or acquires an image stored in the storage unit 18. By performing signal processing such as noise removal, A/D conversion, synchronization processing (which is performed when, for example, an imaging signal of each color component is obtained using a color filter or the like) as necessary, the image acquisition unit 11 generates the image signal including three sheets of subject images to each of which RGB color components are assigned. The image acquisition unit 11 inputs the acquired image signal or the image signal after the signal processing to a movement detection unit 12 as an image signal including an image of interest. When acquiring an image signal from the outside, the image acquisition unit 11 inputs the image signal to the movement detection unit 12 and the storage unit 18. The image acquisition unit 11 may perform OB clamp processing, gain adjustment processing, or the like in addition to the above-described synchronization processing or the like. Examples of the images include subject images which are captured in time series and include a subject such as an image including a subject such as a person, and an intracavity image of a patient acquired by an endoscope (including a capsule endoscope).

The movement detection unit 12 detects a movement in the image using the image (image of interest) which is based on the image signal input from the image acquisition unit 11. In other words, the movement detection unit 12 detects the movement in the images between the movement detection images that are captured at different timing (in time series). The movement detection unit 12 includes a similarity calculation unit 121 and a movement determination unit 122.

The similarity calculation unit 121 calculates a known sum of absolute differences (SAD) using, for example, the G component image out of the three sheets of RGB subject images input from the image acquisition unit 11, and the G component image out of the three sheets of past RGB subject images which is stored in the subject image storage unit 181 and captured temporally earlier than the subject images input from the image acquisition unit 11. Here, the closer the SAD approaches zero, the similarity of the two subject images becomes higher. In addition to this SAD, the similarity calculation unit 121 may obtain a sum of squared difference (SSD) or may obtain a normalized cross correlation (NCC) as the similarity.

The movement determination unit 122 reads an SAD threshold value for the movement determination stored in the storage unit 18, and compares the SAD threshold value with the SAD value calculated by the similarity calculation unit 121. In a case where the SAD value is equal to or greater than the SAD threshold value, the movement determination unit 122 determines that a physical movement of the imaging device or the subject is present. On the other hand, in a case where the SAD value is smaller than the SAD threshold value, it is determined that a physical movement of the imaging device or the subject is not present. The movement determination unit 122 inputs the determination result into the learning candidate image decision unit 13.

In a case where it is determined by the movement detection unit 12 that a movement is present in the input image signal, the learning candidate image decision unit 13 decides that the corresponding subject image is a learning candidate image. The learning candidate image decision unit 13 inputs the image signal corresponding to the subject image to the derivative image generation unit 14 together with the decision information relating to the learning candidate image. On the other hand, in a case where it is determined by the movement detection unit 12 that movement is not present in the input image signal, the learning candidate image decision unit 13 excludes the corresponding subject image from the learning candidate image and waits until the next image signal is input.

The derivative image generation unit 14 generates one or a plurality of derivative images using the subject image of the image signal which is the learning candidate image input from the learning candidate image decision unit 13. In the present embodiment 1, the derivative image generation unit 14 performs at least one of image processing such as known geometric conversion (including enlargement, reduction, translation, rotation, left-right reversal, affine conversion, and projective transformation or the like), grayscale conversion (gamma conversion, tone curve conversion, histogram flattening, contrast adjustment using gain), noise increase/decrease, edge enhancement, color conversion (saturation, hue, brightness), clipping processing, and the like on the learning candidate image (subject image) input from the learning candidate image decision unit 13, and then, generates the derivative image. The derivative image generation unit 14 inputs the generated derivative image to the similarity calculation unit 15.

FIG. 2 is a diagram illustrating a derivative image generated by the derivative image generation unit 14 of the learning image automatic sorting device 1 in the embodiment 1 of the present invention. As an example, in FIG. 2, a derivative image $W_{11}$ in which a subject S is enlarged from a learning candidate image $W_1$, a derivative image $W_{12}$ in which the subject S is rotated by 90°, and a derivative image $W_{13}$ in which the brightness of the subject image $W_1$ is reduced by the derivative image generation unit 14 are illustrated. In this way, the derivative image generation unit 14 performs image processing on the learning candidate image and generates derivative images of which the size, brightness, contrast, and the like are different from those of the learning candidate image.

In addition, the derivative image generation unit 14 may perform enlargement, reduction, rotation, translation, and the like of the learning candidate image using affine conversion. In the affine conversion, when the coordinates before the conversion are (x, y) and the coordinates after the conversion are (x', y'), the coordinates can be expressed as following Equation (1). From Equation (1), a 3×3 matrix expressed as following Equation (2) is obtained, and using this matrix, the coordinates before the conversion are converted into the coordinates after the conversion.

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix} \quad (1)$$

$$\begin{pmatrix} x' \\ y' \\ 1 \end{pmatrix} = \begin{pmatrix} a & b & e \\ c & d & f \\ 0 & 0 & 1 \end{pmatrix} \begin{pmatrix} x \\ y \\ 1 \end{pmatrix} \quad (2)$$

Here, the 2×2 matrix consisting of a to d in Equation (1) performs a linear conversion, and the part consisting of e and f performs conversion of the translation.

The similarity calculation unit 15 respectively calculates the similarities between the learning candidate image decided by the learning candidate image decision unit 13 and the derivative image generated based on the learning candidate image by the derivative image generation unit 14, and the learning image stored in the learning image storage unit 182. The similarity calculation method is the same as the similarity calculation method performed by the similarity calculation unit 121 described above. The similarity calculation unit 15 calculates the similarity between the learning candidate image and the learning image and the similarity between the derivative image and the learning image respectively, and then, inputs the calculation result to the determination unit 16.

The determination unit 16 determines whether or not to store the learning candidate image in the learning image storage unit 182 as a learning image based on the calculation result input from the similarity calculation unit 15. Specifically, the determination unit 16 compares each of the similarity between the learning candidate image and the learning image and the similarity between the derivative image and the learning image with a threshold value for the determination, and determines that the learning candidate image is to be stored in the learning image storage unit 182 as a learning image in a case where all the similarities are smaller than the threshold value. On the other hand, in a case where at least one similarity that is equal to or greater than the threshold value is present among all the similarities, the determination unit 16 determines that the learning candidate image is not to be stored in the learning image storage unit 182 as the learning image.

As described above, the movement detection processing is performed using the temporally successive subject images, and in a case where it is determined that the movement is present, the subject images are decided to be the learning candidate image. Subsequently, the image processing such as the known geometric conversion, the grayscale conversion, the noise increase/decrease, the edge enhancement, and the color conversion is performed on the learning candidate image, and then, one or a plurality of derivative images are generated. Thereafter, the similarities between the stored learning image and each of the learning candidate image and the derivative image are calculated, and then, the determination whether or not the learning candidate image can be set as the learning image is performed. In this way, in the processing for sorting the learning images from the plurality of subject images, it is possible to sort the minimum number of necessary learning images.

The control unit 17 is configured using a central processing unit (CPU) or the like, and performs drive control of each configuration element configuring the learning image automatic sorting device 1 and input/output control of information for each configuration element. The control unit 17 performs control to store the learning candidate image determined by the determination unit 16 as the learning image in the learning image storage unit 182.

The storage unit 18 records various programs for operating the learning image automatic sorting device 1 such as a learning image automatic selection program, and data that includes various parameters necessary for the operation of the learning image automatic sorting device 1. The storage unit 18 is realized by using a semiconductor memory such as a flash memory or a dynamic random access memory (DRAM). The storage unit 18 stores the threshold value used for the determination processing by the movement determination unit 122 and the threshold value used for the determination processing by the determination unit 16.

Subsequently, the processing items performed by each unit of the learning image automatic sorting device 1 will be described with reference to the drawings. FIG. 3 is a flowchart illustrating the processing performed by the learning image automatic sorting device 1 in the embodiment 1 of the present invention. Hereinafter, in the description, it is assumed that each unit operates under the control of the control unit 17.

The image acquisition unit 11 receives an image signal from the outside, or acquires an image stored in the storage unit 18 (Step S101). The image acquisition unit 11 inputs the acquired image signal or the image signal after the signal processing to the movement detection unit 12.

The movement detection unit 12 detects the movement in the image using the image which is based on the image signal input from the image acquisition unit 11 (Step S102). The movement determination unit 122 determines whether or not movement is present after obtaining the similarity as described above, and then, inputs the determination result to the learning candidate image decision unit 13.

The learning candidate image decision unit 13 determines whether or not to decide the subject image to be a learning candidate image based on the determination result by the movement detection unit 12 (Step S103). In a case where it is determined by the movement detection unit 12 that the movement is present in the input image signal (Yes in Step S103), the learning candidate image decision unit 13 decides that the corresponding subject image is a learning candidate image, and inputs the image signal corresponding to the subject image to the derivative image generation unit 14 together with the decision information relating to the learning candidate image, and then, the process proceeds to Step S104. On the other hand, in a case where it is determined by the movement detection unit 12 that the movement is not present in the input image signal (No in Step S103), the learning candidate image decision unit 13 decides that the corresponding subject image is not the learning candidate image, and then, the process proceeds to Step S109.

In Step S104, the control unit 17 determines whether or not the learning image is stored in the learning image storage unit 182. Here, in a case where the control unit 17 determines that the learning image is not stored in the learning image storage unit 182 (No in Step S104), the learning candidate image is set as the learning image, and then, the process proceeds to Step S108. On the other hand, in a case where the control unit 17 determines that the learning image is stored in the learning image storage unit 182 (Yes in Step S104), the process proceeds to Step S105.

In Step S105, the derivative image generation unit 14 generates one or a plurality of derivative images using the subject image of the image signal which is the learning candidate image input from the learning candidate image decision unit 13. As described above, the derivative image generation unit 14 performs the image processing on the learning candidate image to generate one or the plurality of derivative images. The derivative image generation unit 14 inputs the generated derivative images to the similarity calculation unit 15.

In the subsequent Step S106, the similarity calculation unit 15 respectively calculates the similarities between the learning candidate image decided by the learning candidate image decision unit 13 and the derivative image generated based on the learning candidate image by the derivative image generation unit 14, and the learning image stored in the learning image storage unit 182. The similarity calculation unit 15 calculates the similarity between the learning candidate image and the learning image and the similarity between the derivative image and the learning image respectively, and then, inputs the calculation result to the determination unit 16.

Subsequently, the determination unit 16 determines whether or not to store the learning candidate image in the learning image storage unit 182 as a learning image based on the calculation result input from the similarity calculation unit 15 (Step S107). The determination unit 16 compares each of the similarity between the learning candidate image and the learning image and the similarity between the derivative image and the learning image with the threshold value for the determination, and determines that the learning candidate image is to be stored in the learning image storage unit 182 as a learning image in a case where all the similarities are smaller than the threshold value (Yes in Step S107), and the process proceeds to Step S108. On the other hand, in a case where at least one similarity that is equal to or greater than the threshold value is present among all the similarities, the determination unit 16 determines that the learning candidate image is not to be stored in the learning image storage unit 182 as the learning image (No in Step S107), and the process proceeds to Step S109.

In Step S108, the control unit 17 performs registration processing for storing the learning candidate image decided as the learning image in Step S104 or S107 in the learning image storage unit 182 as the learning image. In the way, the subject image selected as the learning candidate image is registered as the learning image.

In Step S109, the control unit 17 determines whether or not a new subject image (image signal) to be sorted as a learning image is input. Here, in a case where the control unit 17 determines that a new subject image (image signal) to be sorted as a learning image is input (Yes in Step S109), the process returns to Step S102 and the processing described above is repeated. On the other hand, in a case where the control unit 17 determines that a new subject image (image signal) to be sorted as a learning image is not input (No in Step S109), the processing ends.

According to the embodiment 1, when sorting the subject images as a learning image, the movement detection unit 12 detects the presence or absence of the movement of the subject in the image of interest using a subject image which is the sorting determination target among a plurality of captured images and a subject image captured temporally earlier than the subject image, the learning candidate image decision unit 13 determines whether or not to select the subject image as a learning candidate image based on the presence or absence of the detected movement, the derivative image generation unit 14 generates one or a plurality of derivative images using the subject image selected as the learning candidate image by the learning candidate image decision unit 13, the similarity calculation unit 15 respectively calculates the similarities between the learning image and the derivative image, and the learning candidate image, and then, the determination unit 16 determines the subject image selected as the learning candidate image as a new learning image based on the similarity calculated by the similarity calculation unit 15. In this way, the subject images in which there is no movement and having high similarity can be excluded from the learning candidate image, the necessity of registering the learning candidate image as the learning image is determined from the similarity between the derivative image obtained by applying the image processing to the learning candidate image and the stored learning image, and the similar images derived from the learning candidate image can be excluded from the learning image. Therefore, the stored learning image can be sorted and the geometric deformation, changes in grayscale, the difference in noise level, and the like can be discriminated. Therefore, the images selected in a repeated manner can be identified and excluded, and thus, it is possible to perform the image recognition processing with high accuracy while suppressing the increase of the number of learning images to be stored.

In the description of the embodiment 1 described above, the determination unit 16 determines that the learning candidate image is stored in the learning image storage unit 182 as the learning image in a case where all the similarities are smaller than the threshold value. However, the invention is not limited thereto, for example, in a case where 90% of the total number of similarities is smaller than the threshold value, the learning candidate image may be stored in the learning image storage unit 182 as the learning image, or the determination criteria may be determined based on statistically determined conditions.

In addition, in the embodiment 1 described above, in a case where the finally selected image is saved as the learning image, the image signal acquired by the image acquisition unit 11, for example, the image data corresponding to the image signal after the A/D conversion and before the noise removal or the synchronization processing may be saved, or the image data corresponding to the image signal to which the signal processing such as the synchronization processing is applied may be saved. However, in a case of saving the image signal acquired by the image acquisition unit 11, when similarity calculation is performed by the similarity calculation unit 121, the signal processing such as the synchronization processing needs to be applied by the image acquisition unit 11 before the calculation of the similarity.

Modification Example 1 of the Embodiment 1

In the description of the embodiment 1 described above, the movement detection unit 12 calculates the SAD value as the similarity to detect the movement, but, the present invention is not limited thereto. In the present modification example 1, the subject image is divided into a plurality of areas, and pattern matching is performed on each area, and then, the movement is detected.

A learning image automatic sorting device in the present modification example 1 includes a movement detection unit 12A instead of the movement detection unit 12 of the learning image automatic sorting device 1 described above. FIG. 4 is a block diagram illustrating a configuration of the movement detection unit 12A of the learning image automatic sorting device in the modification example 1 of the embodiment 1 of the present invention. The movement detection unit 12A includes an area division unit 123, a buffer 124, a similarity calculation unit 125, a movement determination unit 126, and a coefficient storage unit 127. The buffer 124 stores an image signal including a subject image input from the image acquisition unit 11. When the capacity is insufficient (when the image signals of a predetermined number of frames are stored), the buffer 124 stores a predetermined number of frames from the latest image signal by overwriting the oldest image signal in time series to the latest image signal. The coefficient storage unit 127 stores the number of divisions for the area division unit 123 to divide the image, the size of the divided area, and the threshold value used for the determination processing by the movement determination unit 126.

The area division unit 123 extracts a predetermined block area size referring to the coefficient storage unit 127 and divides the subject image acquired from the image acquisition unit 11 into a plurality of block areas. The area division unit 123 inputs the subject image after the area division processing to the similarity calculation unit 125.

The similarity calculation unit 125 acquires information on a size of a detection area used for template matching processing referring to the coefficient storage unit 127, and performs known template matching processing (calculates the SAD value, SSD value or NCC value) on the subject image of each area after the area division processing by the area division unit 123 and the temporally previous subject image stored in the buffer 124 based on the information.

FIG. 5 is a diagram for explaining the movement detection performed by the movement detection unit 12A of the learning image automatic sorting device in the modification example 1 of the embodiment 1 of the present invention. As illustrated in FIG. 5, it is assumed that a divided area is positioned at coordinates (x, y) in an orthogonal coordinate system in which the horizontal direction of the rectangular subject image W2 is the X direction and the vertical direction is the Y direction, for example, at the coordinates (x, y) corresponding to the position of the pixel. The area division unit 123 divides the subject image obtained from the image acquisition unit 11 into a plurality of areas based on the information on the size of the divided area obtained by referring to the coefficient storage unit 127. The information on the size of the divided area has, for example, a vertical width and a horizontal width corresponding to the number of pixels.

The similarity calculation unit 125 detects a movement amount of the divided area R using the position coordinate SB (x, y) of the center of the divided area R of interest as a representative point. At this time, the similarity calculation unit 125 performs the template matching processing on the divided area R and the detection area. The divided area R is the divided area to be processed among a plurality of divided areas on which the template matching processing is sequentially performed. The information on the size of the detection area is the start coordinate SA $(x_0, y_0)$ and the end coordinate EA $(x_1, y_1)$ of the detection area, and the lengths of the detection area in the horizontal direction (X direction) and the vertical direction (Y direction) are longer than the lengths in the vertical direction and the horizontal direction of the divided area respectively. In the present modification example 1, the similarity calculation unit 125 collates the upper left pixel of each divided area with the pixel at the upper left of the detection area in the past subject image in FIG. 5, and calculates the SAD value described above corresponding to a pixel value at the same position. Thereafter, the SAD value is calculated while moving by one pixel in the X direction, and calculates the SAD value while moving by one pixel in the Y direction respectively. After calculating the SAD value of the divided area R for all the detection areas, the minimum SAD value is extracted from the plurality of SAD values and is set as the representative SAD value of the divided area to be processed. In this way, the representative SAD value for all the divided areas is calculated by the template matching processing. The similarity calculation unit 125 inputs the calculated plurality of representative SAD values to the movement determination unit 126.

The movement determination unit 126 reads the SAD threshold value used for the movement determination stored in the coefficient storage unit 127 and compares the read threshold value with the plurality of representative SAD values input from the similarity calculation unit 125. In a case where the representative SAD value is equal to or greater than the SAD threshold value, the movement determination unit 126 increases the count number of movement determination by 1. Here, the initial value of the count number of the movement determination is zero. After completing the comparison of the SAD threshold value with the representative SAD values of all divided areas, the movement determination unit 126 acquires the count threshold value of movement determination referring to the coefficient storage unit 127, and then, compares the count threshold value with the count number of the movement determination of the subject image. In a case where it is determined that the count number of the movement determination of the subject image is equal to or greater than the count threshold value, the movement determination unit 126 determines that a physical movement of the imaging device or the subject is present between the compared images. On the other hand, in a case where it is determined that the count number of the movement determination of the subject image is smaller than the count threshold value, the movement determination unit 126 determines that the physical movement of the imaging device or the subject is not present between the compared images. The movement determination unit 126 inputs the subject image and the determination result to the learning candidate image decision unit 13.

After that, the learning candidate image decision unit 13 determines whether or not to select the subject image as a learning candidate image based on the presence or absence of the detected movement, the derivative image generation unit 14 generates one or a plurality of derivative images using the subject image selected as the learning candidate image by the learning candidate image decision unit 13, the similarity calculation unit 15 calculates the similarities between the learning image, and the learning candidate image and the derivative image respectively, and the determination unit 16 determines the subject image selected as the learning candidate image as a new learning image based on the similarity calculated by the similarity calculation unit 15.

In this way, similarly to the embodiment 1, the subject images in which there is no movement and having high similarity can be excluded from the learning candidate image, the necessity of registering the learning candidate image as the learning image is determined from the similarity between the derivative image obtained by applying the image processing to the learning candidate image and the stored learning image, and the similar images derived from the learning candidate image can be excluded from the learning image. Therefore, the stored learning image can be sorted and the geometric deformation, changes in grayscale, a difference in noise level, and the like can be discriminated. Therefore, the images selected in a repeated manner can be identified and excluded, and thus, it is possible to perform the image recognition processing with high accuracy while suppressing the increase of the number of learning images to be stored.

In the description of the present example 1, the similarity is calculated using all the pixels of the subject image, but not limited to such a configuration. For example, in order to reduce the amount of calculation, the subject image may be reduced in size, and the similarity may be calculated using this reduced subject image.

Modification Example 2 of Embodiment 1

In the description of the embodiment 1 described above, the learning candidate image decision unit 13 determines whether or not to set the subject image as the learning candidate image based on the movement detection information input from the movement detection unit 12, however, the present invention is not limited thereto. In the present modification example 2, in addition to the movement detection information, whether or not to set the subject image as the learning candidate image is determined based on shake information obtained by detecting a shake of the subject image.

FIG. 6 is a block diagram illustrating a functional configuration of a learning image automatic sorting device 1A in the modification example 2 of the embodiment 1 of the present invention. The learning image automatic sorting device 1A in the present modification example 2 further includes a shake detection unit 19 in addition to the configuration of the learning image automatic sorting device 1 described above.

When a subject image is input from the image acquisition unit 11, the shake detection unit 19 detects a shake of the subject image and generates shake information. The detection of the shake of the image can be performed using, for example, a method disclosed in Japanese Patent No. 2829073 or a method of detecting using a sensor.

In addition to the determination result of the movement detection described above, the learning candidate image decision unit 13 excludes the subject image from the learning candidate image when shake is detected from the subject image according to the shake information.

According to the present modification example 2, whether or not to set a learning candidate image is decided using the detection information on the shake in the subject image in addition to the movement in the subject image. Therefore, only the clear subject image can be registered as the learning image while suppressing the increase in the number of learning images to be stored, and thus, it is possible to perform the image recognition processing with higher accuracy.

In the description of present modification example 2, the shake of the image is detected, however, a blur indicating a degree of focus (edge) may be detected. In this case, blur information is generated, and the learning candidate image decision unit 13 determines whether or not to set the subject image as the learning candidate image based on the movement detection information and the blur information.

Embodiment 2

In the description of the embodiment 1 described above, the derivative image generation unit 14 generates the derivative image using the subject image determined as the learning candidate image, however, the present invention is not limited thereto. FIG. 7 is a block diagram illustrating a functional configuration of a learning image automatic sorting device 1B in an embodiment 2 of the present invention. In the learning image automatic sorting device 1B in the embodiment 2, the derivative image generation unit 14 generates a derivative image of the learning image stored in the learning image storage unit 182.

When the learning image stored in the learning image storage unit 182 is acquired, the derivative image generation unit 14 generates one or a plurality of derivative images by applying the above-described image processing to the acquired learning image. The derivative image generation unit 14 inputs the generated derivative image to the similarity calculation unit 15. In the embodiment 2, the similarity calculation unit 15 acquires the learning candidate image from the learning candidate image decision unit 13.

The similarity calculation unit 15 calculates the similarities between the learning candidate image decided by the learning candidate image decision unit 13, and the learning image and the derivative image generated by the derivative image generation unit 14 based on the learning image, respectively. The similarity calculation unit 15 calculates the similarity between the learning candidate image and the learning image, and the similarity between the learning candidate image and the derivative image, respectively, and then, inputs the calculation result to the determination unit 16.

As described above, the determination unit 16 determines whether or not to store the learning candidate image in the learning image storage unit 182 as the learning image based on the calculation result input from the similarity calculation unit 15.

According to the embodiment 2 described above, when sorting the subject images as a learning image, the movement detection unit 12 detects the presence or absence of the movement of the subject in the image of interest using a subject image which is the sorting determination target among a plurality of captured images and a subject image captured temporally earlier than the subject image, the learning candidate image decision unit 13 determines whether or not to select the subject image as a learning candidate image based on the presence or absence of the detected movement, the derivative image generation unit 14 generates one or a plurality of derivative images using the learning image stored in the learning image storage unit 182, the similarity calculation unit 15 respectively calculates the similarities between the learning candidate image, and the learning image and the derivative image, and then, the determination unit 16 determines the subject image selected as the learning candidate image as a new learning image based on the similarity calculated by the similarity calculation unit 15. In this way, the subject images in which there is no movement and having high similarity can be excluded from the learning candidate image, the necessity of registering the learning candidate image as the learning image is determined from the similarity between the derivative image obtained by applying the image processing to the learning candidate image and the stored learning image, and the similar images derived from the learning candidate image can be excluded from the learning image. Therefore, the stored learning image can be sorted and the geometric deformation, changes in grayscale, a difference in noise level, and the like can be discriminated. Therefore, the images selected in a repeated manner can be identified and excluded, and thus, it is possible to perform the image recognition processing with high accuracy while suppressing the increase in the number of learning images to be stored.

Embodiment 3

In the description of the embodiments 1 and 2 described above, the derivative image generation unit 14 generates the derivative image using any one of the subject image determined as the learning candidate image or the learning image, however, the present invention is not limited thereto. In a present embodiment 3, it is assumed that the derivative image generation unit 14 can set which of the subject image determined as the learning candidate image and the learning image stored in the learning image storage unit 182 will be used for generating the derivative image.

FIG. 8 is a block diagram illustrating a functional configuration of a learning image automatic sorting device 1C in the embodiment 3 of the present invention. The learning image automatic sorting device 1C in the embodiment 3 further includes a setting input unit 20 in addition to the configuration of the learning image automatic sorting device 1 described above.

The setting input unit 20 is an interface for performing a user's input to the learning image automatic sorting device 1C, and is realized by, for example, input devices such as a keyboard, a mouse, a touch panel, various switches, and the like, receives an input of an instruction signal generated in response to an external operation on these input devices, and inputs the received instruction signal to the control unit 17. Specifically, for example, the setting input unit 20 receives the input instruction signal for performing the setting which of the subject image determined as the learning candidate image and the learning image stored in the learning image storage unit 182 will be used as the image when the derivative image generation unit 14 generates the derivative image.

According to the present embodiment 3, since the derivative image generation unit 14 can set which of the subject image determined as the learning candidate image and the learning image stored in the learning image storage unit 182 will be used for generating the derivative image, the learning image can be automatically selected by the user's selection. Therefore, it is possible to improve a degree of freedom of processing.

Other than the setting input unit 20, among the number of images input as the subject image (the number of learning candidate images) and the number of learning images stored in learning image storage unit 182, the images of the greater number or the less number may be selected, and the setting for generating the derivative image using the selected image may be automatically performed.

The present invention is not limited to the above-mentioned embodiments and modification examples as they are. In the implementation stage, the configuration elements can be modified and embodied within the scope without departing from the gist of the invention. In addition, various inventions can be formed by appropriately combining a plurality of configuration elements disclosed in the embodiments described above. For example, some configuration elements may be deleted from the entire configuration elements disclosed in the embodiments and modification examples described above. Furthermore, the configuration elements described in each embodiment and the modification example may be appropriately combined.

As described above, the present invention can include various embodiments not described here, and it is possible to appropriately change the design and the like within the scope not departing from the technical idea described in the claims.

INDUSTRIAL APPLICABILITY

As described above, a learning image automatic sorting device, a learning image automatic sorting method, and a learning image automatic sorting program in the present invention are useful to sort the learning images to be stored while identifying and eliminating the repeated images by discriminating the geometric deformation, the changes in grayscale, the difference in noise level, and the like.

REFERENCE SIGNS LIST 1, 1A, 1B, 1C learning image automatic sorting device
11 image acquisition unit
12, 12A movement detection unit
13 learning candidate image decision unit
14 derivative image generation unit
15 similarity calculation unit
16 determination unit
17 control unit
18 storage unit
19 shake detection unit
20 setting input unit
181 subject image storage unit
182 learning image storage unit

The invention claimed is:

1. A learning image automatic sorting device that automatically sorts learning images used for image recognition processing from a plurality of captured images captured in time series, comprising:
   movement detection means for detecting a movement amount of a subject in an image of interest using the image of interest which is a sorting determination target among the plurality of captured images and an image captured temporally earlier than the image of interest;
   a decision unit that decides whether or not to select the image of interest as a learning candidate image based on the movement amount;
   a derivative image generation unit that generates one or a plurality of derivative images using at least one of the image of interest selected as the learning candidate image by the decision unit and the learning image;
   a similarity calculation unit that calculates a similarity between the learning candidate image and the learning image and a similarity between the one or the plurality of derivative images and the learning image, or a similarity between the one or the plurality of derivative images and the learning candidate image;
   a sorting unit that sorts the image of interest selected as the learning candidate image, as a new learning image based on the similarity calculated by the similarity calculation unit and the statistically determined condition; and
   a storage unit that stores the learning image.

2. The learning image automatic sorting device according to claim 1,
   wherein the sorting unit compares the similarity with a threshold value, and in a case where a predetermined ratio of the similarity to the value of the similarity calculated by the similarity calculation unit is less than the threshold value, the sorting unit sorts the image of interest selected as the learning candidate image as a new learning image.

3. The learning image automatic sorting device according to claim 1,
   wherein the derivative image generation unit generates the derivative image by performing at least one of image conversion processing selected from a group of a geometric conversion, a grayscale conversion, a noise increase/decrease, a saturation enhancement, an edge enhancement, and a color conversion on the learning candidate image.

4. The learning image automatic sorting device according to claim 1, further comprising:
   a detection unit that detects shake information or blur information on the image of interest,
   wherein the decision unit excludes the image of interest from the learning candidate image in a case where a shake or a blur is detected from the image of interest using shake information or blur information.

5. The learning image automatic sorting device according to claim 1, further comprising:
   a setting unit that performs setting of a target image for generating the derivative image among the learning candidate image and the learning image.

6. The learning image automatic sorting device according to claim 1,
   wherein the derivative image generation unit generates the one or the plurality of derivative images using the image of interests selected as the learning candidate image by the decision unit.

7. A learning image automatic sorting method for automatically sorting a learning image used for image recognition processing from a plurality of captured images captured in time series, comprising:
   detecting a movement amount of a subject in an image of interest using the image of interest which is the sorting determination target among the plurality of captured images and an image captured temporally earlier than the image of interest;
   deciding whether or not to select the image of interest as a learning candidate image based on the movement amount;
   generating one or a plurality of derivative images using at least one of the image of interest selected as the learning candidate image by the decision unit and the learning image;
   calculating a similarity between the learning candidate image and the learning image and a similarity between the one or the plurality of derivative images and the learning image, or a similarity between the one or the plurality of derivative images and the learning candidate image;
   sorting the image of interest selected as the learning candidate image, as a new learning image based on the similarity calculated by the similarity calculation unit and the statistically determined condition; and
   storing the image of interest sorted as the selected learning candidate image as the learning image.

8. A non-transitory computer-readable storage medium storing a learning image automatic sorting program for automatically sorting a learning image used for image recognition processing from a plurality of captured images captured in time series, wherein the program causes a computer to execute:
   a detection procedure for detecting the movement amount of a subject in an image of interest using the image of interest which is the sorting determination target among the plurality of captured images and an image captured temporally earlier than the image of interest;

a decision procedure for deciding whether or not to select the image of interest as a learning candidate image based on the movement amount;

a derivative image generation procedure for generating one or a plurality of derivative images using at least one of the image of interest selected as the learning candidate image by the decision unit and the learning image;

a similarity calculation procedure for calculating a similarity between the learning candidate image and the learning image and a similarity between the one or the plurality of derivative images and the learning image, or a similarity between the one or the plurality of derivative images and the learning candidate image;

a sorting procedure for sorting the image of interest selected as the learning candidate image, as a new learning image based on the similarity and statistically determined conditions; and a storing procedure for storing the image of interest selected as the selected learning candidate image as the learning image.

* * * * *